United States 
Martin et al.

[15] 3,648,176
[45] Mar. 7, 1972

[54] ADJACENT CHANNEL MEASUREMENT TEST SYSTEM

[72] Inventors: David R. Martin, Agoura; Walter A. Sauter, Malibu, both of Calif.

[73] Assignee: American Nucleonics Corporation, Woodland Hills, Calif.

[22] Filed: Aug. 20, 1970

[21] Appl. No.: 65,561

[52] U.S. Cl. .......................... 325/133, 325/363, 325/476, 328/165
[51] Int. Cl. .......................................................... H04b 1/04
[58] Field of Search .............. 325/49, 65, 67, 133, 363, 473, 325/475, 476; 328/165, 166

[56] References Cited

UNITED STATES PATENTS 3,204,047  8/1965  Trost .................................. 325/476 X
3,544,904  12/1970  Eness ................................. 325/475 X

*Primary Examiner*—Robert L. Richardson
*Assistant Examiner*—Kenneth W. Weinstein
*Attorney*—John E. Wagner

[57] ABSTRACT

A system for cancelling or suppressing the amplitude of the carrier and sideband signals of a radio transmitter to facilitate analysis of spurious and noise outputs from the transmitter is disclosed. The system includes means for deriving a carrier cancelling signal from an actual sample of the transmitter output, signal processing circuitry and summing means. Also, an electromechanical signal controller is disclosed capable of continuously correcting the amplitude of the cancellation signal by a selected ratio with respect to the transmitter test signal.

13 Claims, 10 Drawing Figures

Patented March 7, 1972 3,648,176

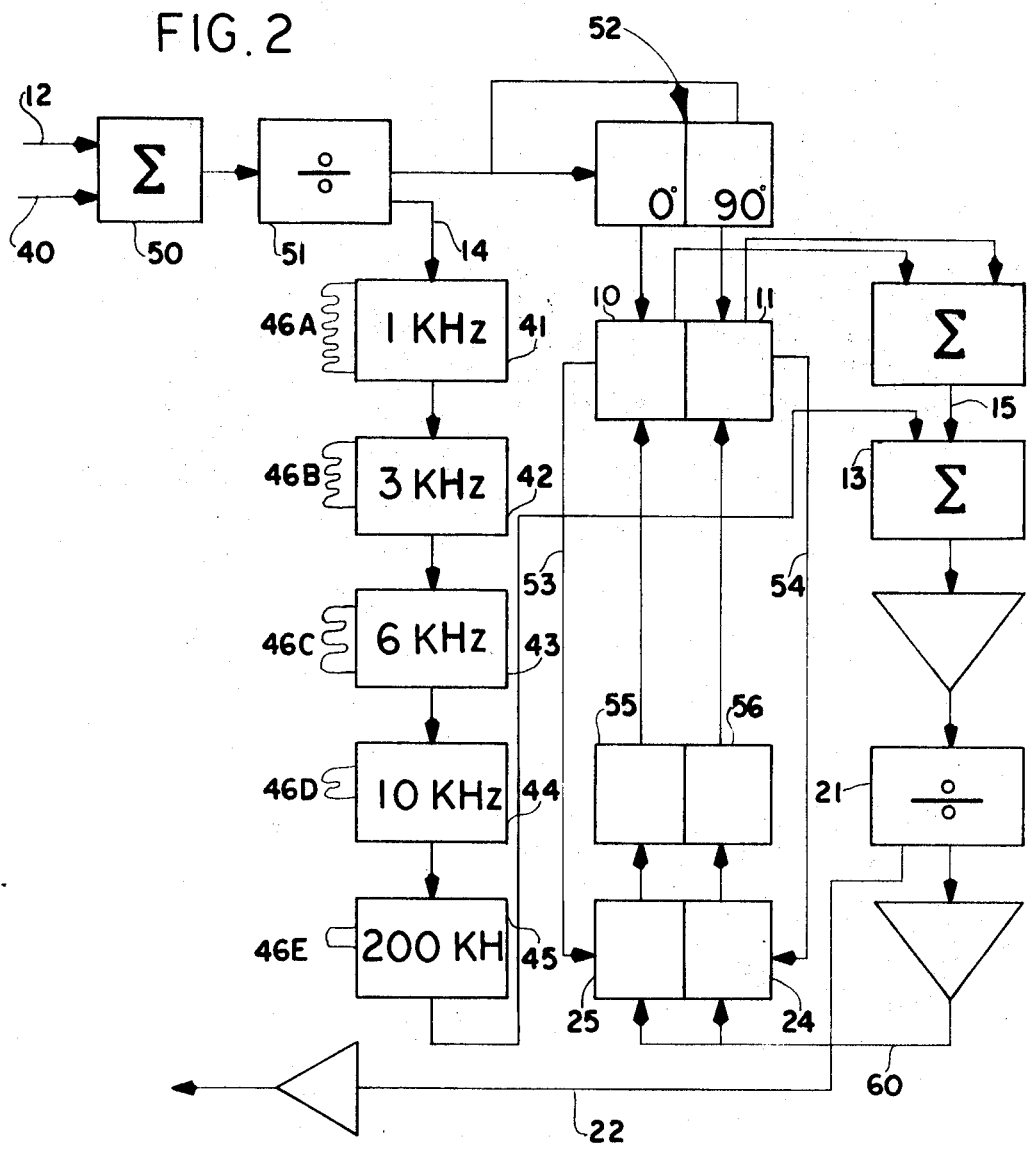

Patented March 7, 1972

INVENTORS
DAVID R. MARTIN
WALTER A. SAUTER

BY John E. Wagner

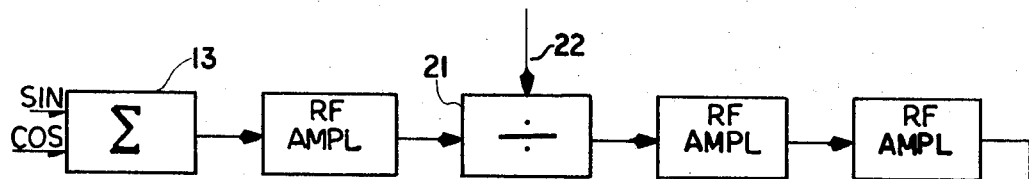
FIG. 7
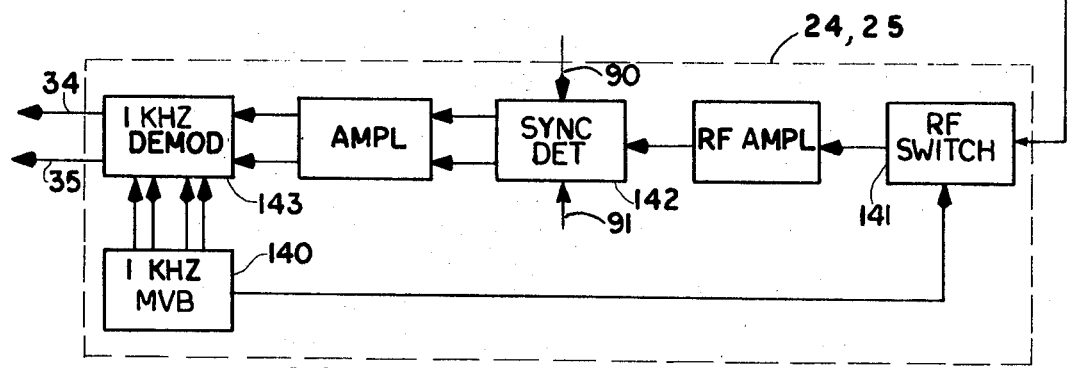
FIG. 8
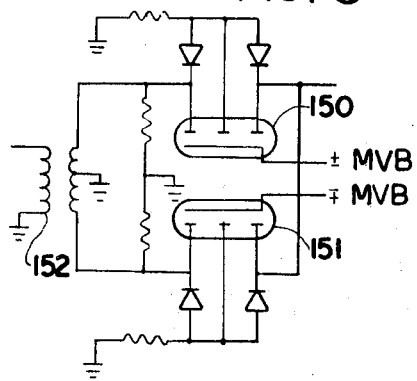
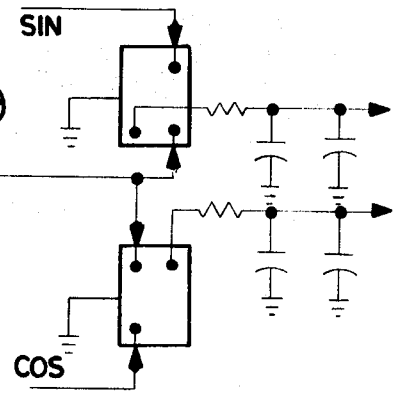
FIG. 9
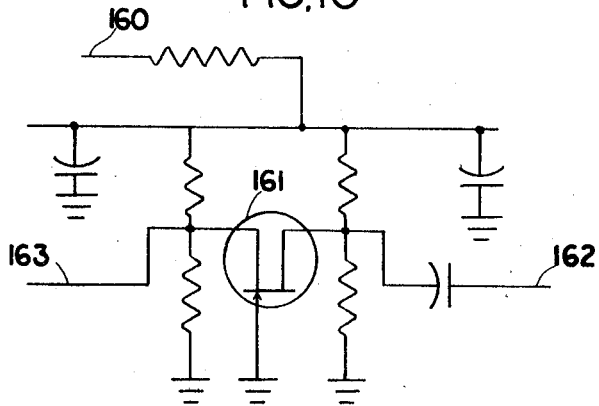
FIG. 10

ADJACENT CHANNEL MEASUREMENT TEST SYSTEM

BACKGROUND OF THE INVENTION

The need to measure the spurious and noise outputs of high frequency/very high frequency/ultrahigh frequency (HF/VHF/UHF) transmitters from ±1 channel width to ±5 MHz. from the tuned carrier frequency heretofore has posed a difficult measurement problem because of the large dynamic range between the carrier, sideband, and spurious output levels. Usually, the sideband power is more than 100 db. below the carrier level at ±5 channel widths. The dynamic range of present spectrum analyzers used for sideband splatter measurement is limited to approximately 70 db. which, in most cases, provides splatter information only 1 or 2 channel widths out from the tuned frequency. The problem becomes involved when the frequency separation between the spurious outputs and the main carrier is insufficient to permit resolution by conventional passive filters. Consequently, the problem of accurate measurements of spurious and noise outputs is difficult when the sideband power is more than 70 db. below the carrier level.

Heretofore, adjacent channel spurious signal measurements have been made only to the extent that passive filtering techniques will allow. The basic concept of cancellation of a selected carrier signal by adjusting the amplitude and phase of a correction signal and combining it with the carrier is known in the art. Our copending U.S. Pat. application, Ser. No. 799,781, filed Feb. 17, 1969, also discloses a concept for cancelling an unwanted signal by the derivation of two components of the undesired signal, adjusting the amplitude of the components by a ratio, and adding the adjusted component signals to the unwanted signal, similar to this invention.

BRIEF STATEMENT OF THIS INVENTION

We have employed the basic two component control concept of our above-identified invention and produced a signal cancellation system capable of not only eliminating interference from adjacent transmitters but which is able to cancel the carrier and modulation of an operating transmitter in order to measure its spurious outputs.

The system in accordance with this invention employs not only the concept of our above-identified application, but also includes a self-referenced tracking loop with both velocity and acceleration feedback in the electromechanical signal controller.

The system includes means for sampling a transmitter signal developing their sine and cosine components, an electromechanical signal controller for introducing an amplitude adjustment to each of the components, and means for combining the modified amplitude components with the sampled signal to substract the carrier signal and its modulation. Additionally, this system employs selective delay means which introduce a controlled amount of relative delay into the test signal whereby the carrier and to a variable extent the modulation is cancelled.

A novel signal controller employs a RF potentiometer directly coupled to both a drive motor and a velocity generator whereby corrections in the potentiometer position may be made automatically by driving the motor and the speed or movement of the controller can be monitored and used as a velocity and acceleration feedback control.

BRIEF DESCRIPTION OF THE DRAWINGS

Our invention may be more clearly understood from the following detailed description and by reference to the drawings in which:

FIG. 2 is a simplified block diagram of the circuitry for synthesizing a carrier cancelling system;

FIG. 7 is a block diagram of the summer/amplifier/detector assembly of FIG. 4;

FIG. 8 is an electrical schematic diagram of the demodulators of FIG. 7;

FIG. 9 is an electrical schematic diagram of the synchronous detector of FIG. 7; and, FIG. 10 is an electrical schematic of the RF switch of FIG. 7.

DETAILED DESCRIPTION OF THE INVENTION

The essential principle of operation of this invention is based on the fact that the output of a radio transmitter, including its sideband and spurious frequency components, appears at the receiving or measurement point by a linear process. In other words, the spectral characteristics of the signal at a receiver is the same as that of the transmitter signal. There could be an arbitrary phase lag and attenuation between the signal at the source and the corresponding signal as it appears at the measurement point. The system controls a reference signal sample obtained from a radio transmitter by adjusting its phase and amplitude so that it will cancel the carrier of the signal being received at the measurement point. The subtraction of this appropriately controlled reference signal sample is accomplished in real time.

It is evident from the theory of such a signal cancellation system that the amplitudes and phases of the cancelling signal and test signal must be very nearly the same. Thus, for example, their phases must be within $10^{-3}$ radian to reduce the interference by 60 db., even when their amplitudes are identically the same. The control of the phase of a signal with this degree of precision often poses insurmountable physical problems. However, a signal whose amplitude and phase vary arbitrarily with time can be uniquely transformed into two signal components whose amplitude ratios only change with time. By maintaining precise control of these amplitude ratios, this invention synthesizes a cancellation signal with a degree of precision not attainable through independent amplitude and phase controls. The amount of relative cancellation of the sideband and spurious frequencies is adjustable via the channel width switches. Each switch adds enough coaxial cable to the test signal path length to cause the amount of cancellation at one channel width away from the carrier to be down by at least 3 db. due to the associated electrical phase error.

Figure 1:
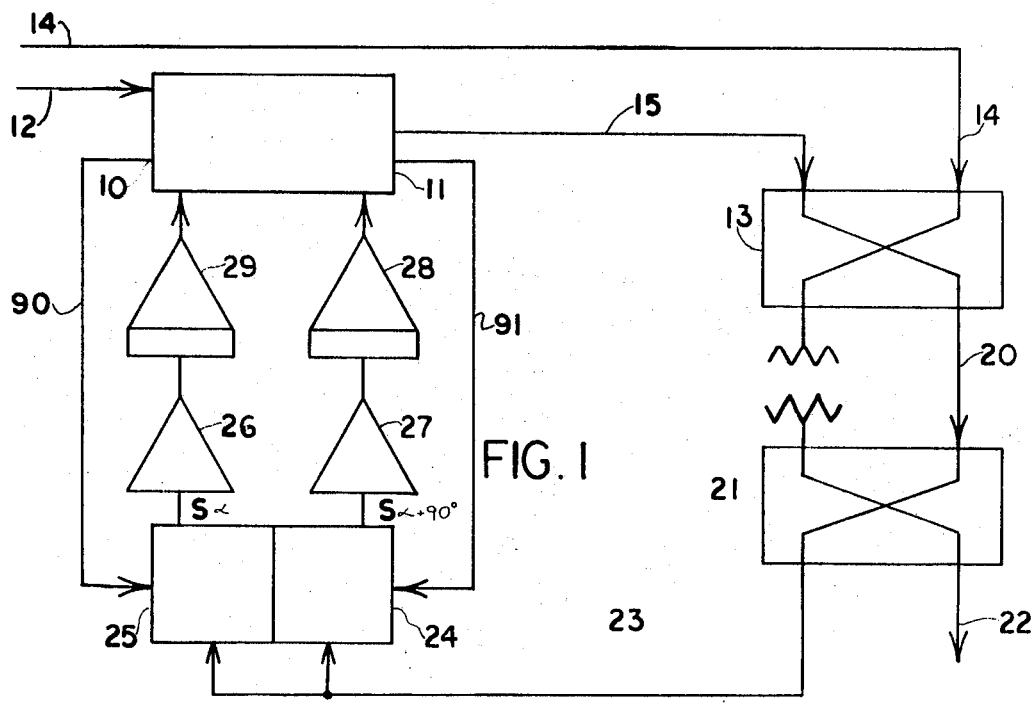
FIG. 1 is a simplified block diagram of the signal cancellation system of this invention.

Now referring to FIG. 1, the basic principle of the invention may be seen. It includes as the basic element a pair of signal controllers 10 and 11 into which a reference signal, in this case a sample of the output of the radio transmitter to be analyzed, is applied over lead 12 while the same signal from the transmitter under test and unshown in the drawing is applied to a coupler 13 via lead 14. Carrier cancelling signals produced by the signal controllers 11 and 10 which are derived in the manner described below are applied to the coupler 13 over lead 15. The summation of the transmitter signal on lead 14 and the correction or cancellation signal of lead 15 appears on lead 20 and thence passing through a second coupler 21 to an output lead 22. In normal circumstances the lead 22 is connected to the test signal input to a spectrum analyzer, not shown in the drawing. The correction system constitutes a tracking loop by reason of the application of the corrected signal via lead 23 to the control circuitry for the signal controllers 10 and 11. This control circuitry includes a pair of synchronous detectors 24 and 25, DC amplifiers 26 and 27 and integrator amplifiers 28 and 29. Synchronism for the entire correction system is obtained from the transmitter over leads 90 and 91.

Operation of the system as disclosed in FIG. 1 is as follows:

The reference signal on lead 12 is shifted in phase and changed in amplitude by the pair of signal controllers 10 and 11. The change of amplitude, $k$, and the phase shift, $\Phi$, are so adjusted that the output of the signal controllers yields a spectrum identical to that needed for the cancelling signal. The amplitude factors $k$ of the respective signal controllers 10 and 11 is developed from the DC content of demodulated components $S\beta$ and $S\beta+90°$ of the residual signal after summing on lead 23. The phase change, $\Phi$, corresponds to an equilibrium time delay, $\tau$, such that the cancellation is not restricted to one carrier frequency.

Before an equilibrium condition is reached or during the period where the carrier frequency within the channel changes, the values of $k$ and $\Phi$ will not be exactly the same as required. To obtain a high degree of cancellation capability, therefore, one must continuously adjust these values such that correct values of $k$ and $\Phi$ are obtained at all times. This correction is achieved by high gain, automatic tracking loops including couplers 13, 21, synchronous detectors 24 and 25 amplifiers 26-29. Employing this invention, the functions $k$ and $\Phi$ are not ordinarily time varying functions. Therefore, the signal synthesis process necessary for the operation of the system does not require these two parameters to change at the RF frequency. Furthermore, since $k$ and $\Phi$ change very slowly, the maintenance of the uniform cancelling signal on a continuous basis, becomes considerably simplified. Also, the problem of the usual time lag between the synthesization of the cancellation signal and its subtraction from the test signal is completely avoided in this approach.

Next referring to FIG. 2, a simplified block diagram of an actual embodiment of this invention is shown therein. The same functional elements appearing in FIG. 1 are given identical numbers in this and succeeding figures of the drawing for clarity. In this embodiment, the system is designed to cancel the carrier and modulation for radio transmitters operating in the amplitude, frequency, pulse code, single sideband or continuous wave modes of operation. This is possible by merely the addition of selected delay in the branch 14 by means of selector switches 41 through 45 each providing either a through conductive path therethrough or a delay line of different length for each switch operated. Typical delays of 2.4 to 430 nanoseconds are achieved by respective lengths of coaxial cable for each of the switches as tabulated below:

| switch | 41 | 300' RG | 55B/U coaxial cable |
|---|---|---|---|
|  | 42 | 100' RG | 55B/U coaxial cable |
|  | 43 | 50' RG | 55B/U coaxial cable |
|  | 44 | 30' |  |
|  | 45 | 1.7' |  |

In the embodiment of FIG. 2, provision is additionally made for determining the absolute level of signal measurements by the (selective) introduction of a calibration signal of known level into the system in parallel with the test signal. This is accomplished through the addition of a summer 50 and a divider circuit 51 at the input end of the system with the normal test signal introduced over lead 12 as shown in FIG. 1 and the calibration input applied to the summer 50 over lead 40.

In the embodiment of FIG. 2, time quadratured samples of the test signal $e_r$ are applied to the signal controllers 10 and 11 from a pair of quadrature couplers 52 and to synchronous detectors 24 and 25 via leads 53 and 54. The function of the signal controllers 10 and 11 is to set the amplitude ratios of the in-phase (sine) and quadrature (cosine) components of the sample signals such that suppression of the carrier frequency can be secured.

The signal controller ratios are set by the two synchronous detectors 24 and 25 circuits, one each for the sine and cosine components. The inputs to each of the synchronous detectors 24 and 25 are:

1. A reference signal over respective lead 53 or 54 in-phase with its signal controller output signal.
2. An amplified sample of the residual signal $e_c - e_c$ after summing.

When the amplified residual signal sample $e_c - e_c$ lead 60 from divider 21 is applied to the sine and cosine synchronous detectors, the sine and cosine components of the residual carrier signal are indicated at the output of their respective synchronous detectors 24 or 25 by proportional DC voltages. These DC error voltages drive their respective amplifiers and signal controllers 10 and 11. The ratio setting of the signal controllers 10 and 11 will increase or decrease until the magnitude of each carrier signal component ratio setting.

A multivibrator and RF switch unshown in block diagram FIG. 2 but shown in FIG. 7 provide effective chopper stabilization of the amplifiers 55 and 56 and eliminate DC offset effects of the synchronous detectors.

The two complementary quadrature couplers 52 are used to shift the phase angle of the reference signal applied to signal controllers 10 and 11 by 90° relative to the other. One unit covers one frequency range such as 3-35 MHz. These quadrature couplers 52 consist of two 180° hybrid junctions. Their collateral ports are coupled together with two compensated phase shift networks. Although the absolute phase shifts through the two networks shift with frequency, their output phase difference is always 90°.

The function of the system of this invention is to subtract the carrier and major sidebands of one sample of a transmitter output signal from another so that the weaker residues of spurious and noise can be measured with a spectrum analyzer such as the Model 851B/8551B produced by Hewlett-Packard Company of Palo Alto, California. This is accomplished by controlling the phase and amplitude of the carrier of one sample of the transmitter output signal so that it is identical in amplitude to, but phase shifted by 180° with respect to the carrier of another sample of the transmitter output signal. Summing of these signals will result in cancellation of the carrier signal and its sidebands. With matched phase lengths of weaker residues of spurious and noise in adjacent channels would normally also be suppressed. The amount of suppression at one or more channel widths from the carrier is controlled by adding or removing lengths of coaxial cable 46 A-E with the channel width switches 41-45.

The use of differential lengths of coaxial cable to generate specific phase angle offset errors for specific differential offset frequencies (channel widths) has the advantage of being independent of the carrier frequency. The system will adjust the reference signal to any arbitrary amplitude and phase angle to effect the required cancellation of the carrier. This capability is independent of the number of carrier wavelengths in the differential path length. An offset or modulation frequency will have a phase angle offset because it will arrive at the summing point late. The resultant electrical phase angle error is directly proportional to the differential path length.

The length of additional coaxial cable required to provide a given phase angle offset can be calculated with the following equation:

$$\Delta l = \kappa_o \cdot \Delta\Phi \cdot \lambda_o / 360°$$

where $\Delta l$ = differential path length $\kappa_o$ = 70 percent; coaxial cable relative velocity of propagation $\Delta\Phi$ = degrees of desired phase angle offset (when $\leq \pm 30°$ $\lambda_o / 360°$ = offset frequency wavelength (meters) divided by the number of electrical degrees per wavelength.

Figure 3:
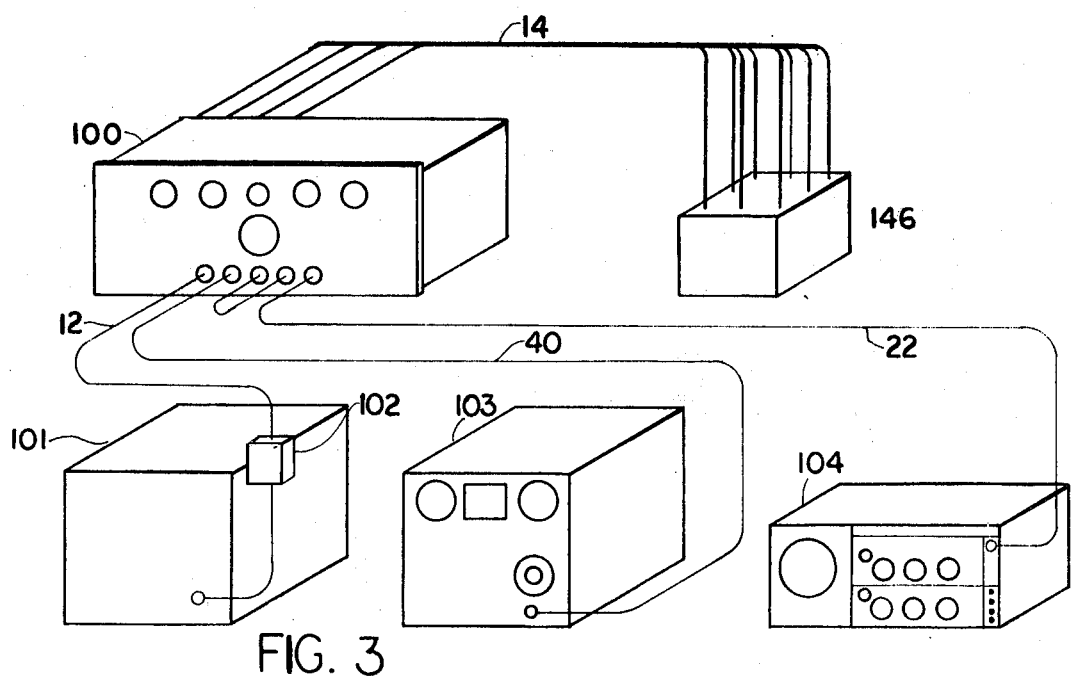
FIG. 3 is a simplified interconnection diagram of this system in use.

A typical installation of this invention is illustrated in FIG. 3 where a system of this invention 100 is shown connected to a test transmitter 101 via lead 12 and a power attenuator 102 designed to prevent overloading of the system. A calibration signal generator 103 furnishing a standard amplitude signal is connected to the system 100 via lead 40. The selectable delay cables 46 A-E of FIG. 2 appears as delay assembly 146 connected to the system via cable 14. The output of the system 100 constituting the transmitter output signal less carrier and modulation appears on lead 22 for introduction into a spectrum analyzer 104 which is then capable of analyzing any noise or spurious output of the transmitter 101 without overloading and submerging of those signals by the carrier.

Figure 4:
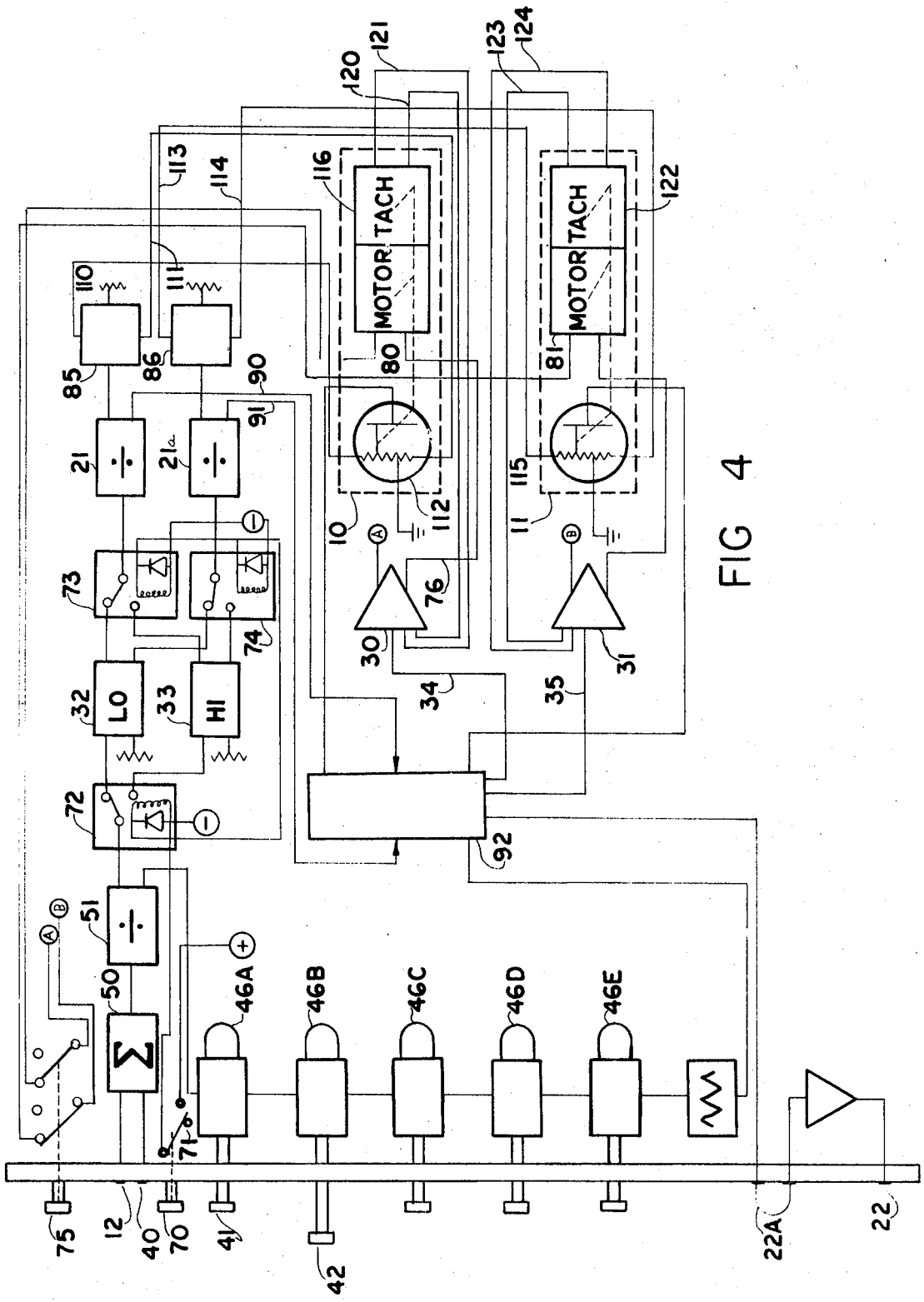
FIG. 4 is an electrical schematic diagram of the embodiment of FIG. 3.

Now refer to FIG. 4 which constitutes a schematic of the embodiment of the system 100 of FIG. 3. In this FIG. 4, certain of the inventive features of the system are shown and are described below. FIG. 4 shows the front panel terminals and controls. They include the input terminal 12 for test signal and terminal 40 for a calibration signal if desired as well as an output terminal on lead 22 designed to be connected to a spectrum analyzer. A jumper 22a and lead 22 for allowing the selection in low level or high level (+20 db.) output to the spectrum analyzer appears in the front panel.

Selector switches 41 through 45 for setting delay time appear in the front panel with switch 42 in its actuated position whereby delay line 46b is inserted in the circuit. One additional selector switch 70 for frequency range selection is shown coupled to a switch 71 in the operating circuit of three relays 72, 73 and 74. In the position shown, the switch 71 is in the low frequency position, for example, 3–35 MHz. In the opposite position with relays 72, 73 and 74 actuated, the system is in its high frequency range, for example, 35–425 MHz.

One additional front control switch 75 serves to disable the servo loop. As shown, switch 75 is in the normal operating condition. With the switch disabled, the servo loop is disabled. The servo loop includes a servoamplifier 30 connected via lead A to the switch 75 and by lead 76 to a motor 80 of the sine signal control 10. Servoamplifier 31 is connected via B to the switch 75 and to a motor 81 of the cosine signal controller 11.

The signal processing within the system of FIG. 4 is as described in connection with FIG. 3 and the same designations are applied in FIG. 3 to the same functional elements. Incoming signal from the test transmitter at terminal 12 is summed in the summation circuit 50 with the calibration input over lead 40 as described above and divided into two signals, the first of which is a reference signal passed through relay 72 and one or the other of quad couplers 32 and 33 which develop two quadrature components of the incoming signal. These quadrature components are applied through relays 73 and 74 to divider circuits 21a associated with the sine and cosine components respectively. These dividers 21 apply sine and cosine inputs to hybrid couplers 85 and 86 associated with respective signal controllers 10 and 11. The dividers also apply sine and cosine inputs over leads 90 and 91, respectively, to the summer amplifier and detector circuit 92, the latter of which is shown in more detail in FIG. 7. Signals reaching the hybrid 85 are applied via leads 110 and 111 to opposite ends of an RF potentiometer 112 forming a part of the signal controller 10. Signals reaching hybrid 86 are applied via leads 113 and 114 to opposite ends of an RF potentiometer 115 of signal controller 11. Both RF potentiometers 112 and 115 have center taps grounded whereby signals may be attenuated and reversed in polarity while passing through them. The potentiometer 112 is mechanically coupled directly to the shaft of the motor 80. Also, directly coupled to the shaft of motor 80 is a tachometer 116 or similar motor operated as a generator to provide a velocity related signal on either lead 120 or 121 depending upon the direction of the rotation of the motor 80. The velocity signal on lead 120 or 121 is applied to the input of the servoamplifier 30 constituting a velocity feedback loop in the signal controller circuit.

Figure 6:
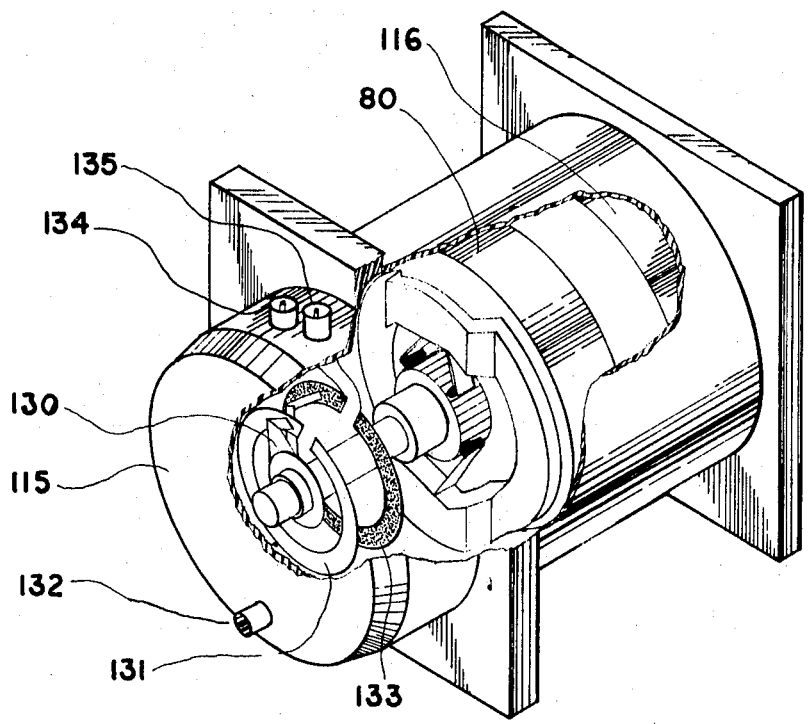
FIG. 6 is a perspective view of the motor, potentiometer, tachometer assembly of FIG. 4 with portions broken away.

The RF potentiometer 115 is similarly mechanically coupled directly to the motor 81 and to tachometer 122 which provides velocity feedback signals over leads 123 or 124 to the servoamplifier 31 thus providing cosine signal controller velocity feedback as well. The mechanical details of the signal controllers 10 and 11 appear in FIG. 6 to which reference is now made and are directly coupled to each other and to wiper arm assembly 130. An interrupted conductive ring 131 connected to terminal 132 constitutes the signal kickoff point for the potentiometer while an interrupted resistive ring 133 connected input terminals 134 and 135 as well as an unshown grounded terminal complete the signal controllers. It is apparent from FIG. 6 that the simple structure shown therein provides a continuously variable reversible polarity potentiometer with feedback capability. Employing this invention, this electromechanical device as shown in FIG. 6 is capable of responding to required changes in correction signal to continuously maintain a correction signal in proper magnitude and phase to provide effective cancellation of the carrier. This is accomplished through both the servo loop tracking of this system via the servoamplifier and velocity feedback from the tachometer 116.

Figure 5:
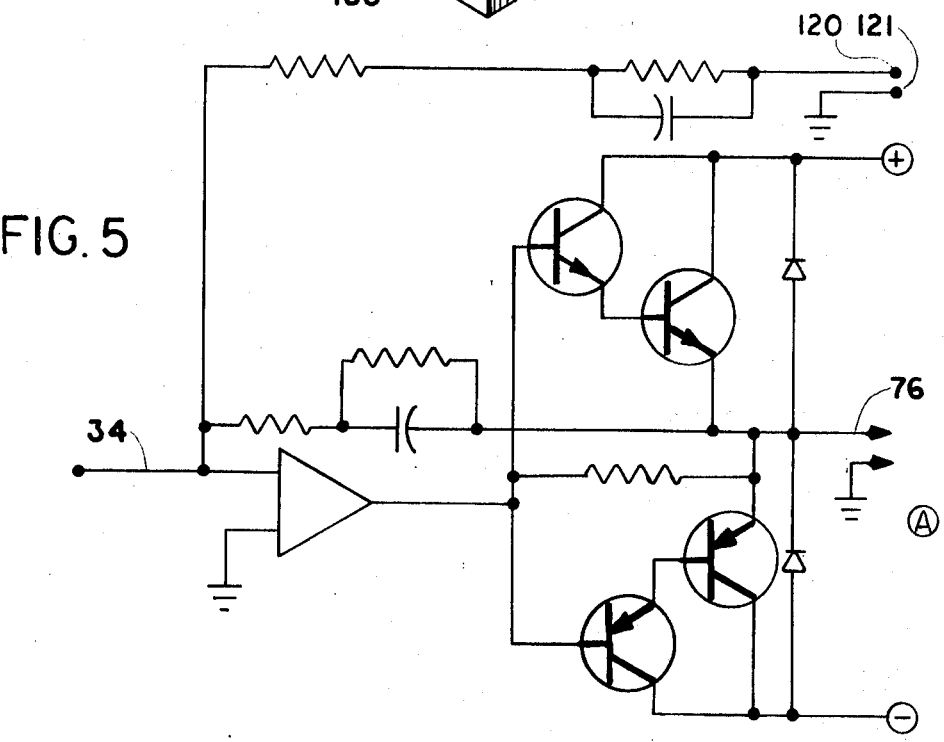
FIG. 5 is an electrical schematic diagram of the servoamplifiers of FIG. 4.

Now refer to FIG. 5 which discloses a circuit which is particularly suitable for the servoamplifier of FIG. 4. It employs two pairs of directly coupled transistors in a complementary symmetry configuration with input signals from the demodulators applied to the base of the transistors of the input stages through an input amplifier and with feedback from the tachometer output of the motor-tachometer assemblies also applied to the input amplifier. The output of the common emitters constitutes the control input to the motor of FIG. 4 and 6.

FIG. 7 shows in block diagram form the circuit arrangement of the summer amplifier detector assembly of FIG. 4.

The circuit 92 constituting FIG. 7 comprises basically the summer 13, divider 21, and demodulators 24 and 25 with their associated amplifiers as shown in FIG. 2. The details of the demodulators 24 and 25 may be seen as including a free running multivibrator 140 operating for example, at 1 kHz. and driving the RF switch 141. This RF switch 141 modulates the amplified combined signal from divider 21 and passes it through another RF amplifier which drives synchronous detectors 142. The synchronous detectors 142 detect the residual signal and provide the in-phase and quadrature error signals. These signals are then amplified and then demodulated by 1 kHz. demodulators 143. The resultant DC output signals on leads 34 and 35 are applied to the servoamplifiers and signal controllers.

A typical demodulator of the circuit of FIG. 7 appears in FIG. 8. It employs a pair of insulated gate field effect transistors 150 and 151 connected in push-pull configuration with the incoming signal applied to a transformer 152 and drive pulses from the multivibrator of FIG. 7 applied to the gate electrode and the demodulated signal extracted from the parallel connected drain electrodes.

The synchronous detectors 142 of FIG. 7 may be seen in FIG. 9 as simple double balanced mixers such as the type FC 200R produced by the Lorch Co. of Englewood, New Jersey.

The RF switch 141 of FIG. 7 is illustrated in FIG. 10 as comprising a grounded gate N channel field effect transistor modulator. The drive is obtained from the multivibrator 140 of FIG. 7 is applied over lead 160 to the source and drain of field effect transistor 161 simultaneously. A positive drive voltage turns the transistor 161 off and when the drive voltage reaches zero, the transistor 161 is turned on and signals are conducted between terminals 162 and 163 with insignificant losses. The foregoing specific circuits described are illustrative only of the particular circuits found to operate successfully as a part of the system of this invention. It is recognized that other specific circuits may be substituted and interconnected in the manner taught herein to obtain the advantages of this invention.

When carrying out the teaching of this invention, the system provides means for accurately measuring electromagnetic spectral characteristics at HF, VHF, and UHF with an amplitude dynamic range as great as 120 db. In practice, the system can be used with spectrum analyzers to expand effectively their dynamic range from a nominal 70 to 120 db. Some of the special features associated with the measurement system, as developed, are as follows:

a. The system employs no band filtering for operation and so has a broad band capability, where a frequency band ranging from 3 to 425 MHz. (a ratio of 108:1) can be accommodated in only two switching steps, b. Through the use of selective delay switching the system can accommodate a wide range of channel widths, c. The system is suited for a wide range of modulations within the channel during adjacent channel measurements, d. It provides external calibration capability for quantitative measurements of the amplitudes in the spectrum, e. The system inherently includes an automatic tracking capability to accommodate any change of the carrier frequency in the channel, f. The system employs linear signal processing so it does not distort the spectral characteristics of the signal even for small amplitudes.

In the foregoing description of this invention, the primary and preferred application has been described, that is, in conjunction with the analysis of the output of the radio transmitter using a spectrum analyzer. It must be recognized, however, that the use of this invention is in no way limited to spectrum analyzer applications nor for that matter to radio transmitters. In particular, any communication system having a predominant carrier or signal and subject to spurious signals below the level of the carrier can benefit from this invention. Therefore, in the reading of the foregoing specification, keep in mind that the source of signal which is processed with this invention and its ultimate utilization device may be significantly different from the radio transmitter and spectrum analyzer disclosed without departing from this invention. It is further recognized that one skilled in the art might by simple modifications vary the particular arrangement of elements making up this invention as described above. Therefore, the patent granted hereunder is not limited to the specific disclosure but to the invention as described in the following claims and their equivalents.

We claim:

1. A system for cancelling the carrier frequency output of a radio transmitter to allow the detection and analysis of spurious radiation by the radio transmitter comprising, means for deriving a first continuous sample of the output of a radio transmitter including carrier, modulation, if any, and spurious signals, means for deriving two quadratured component signals from said derived sample of transmitter output, means for deriving a second continuous sample of the output of said same radio transmitter including carrier, modulation, if any, and spurious signals, means for introducing a selected delay into said second sample, individual means for controlling the amplitude of said two quadratured component signals, means for subtractively combining each of said amplitude controlled quadrature component signals with said delayed second sample, means for deriving DC signals proportional to the magnitude of the residual signals output of said subtractive combining means, and means for applying said derived DC signals to said respective amplitude controlling means to adjust said amplitude controlling means to reduce said residual signal to a minimum, an output terminal, and means connected to said subtractive combining means for deriving the radio transmitter residual output of interest.

2. The combination in accordance with claim 1 wherein said delay introducing means introduces a phase angle offset related to the bandwidth of the carrier and modulation to be cancelled.

3. The combination in accordance with claim 1 wherein said delay introducing means is controllable to introduce a delay in said second sample having the following relationship to the radio transmitter channel width: the delay is inversely proportional to the said channel band width.

4. The combination in accordance with claim 1 wherein said delay means comprises a plurality of lengths of coaxial cable and switch means for selectively connecting said coaxial cable into the path of said second continuous sample.

5. The combination in accordance with claim 1 wherein said individual amplitude controlling means comprise a pair of continuously variable resistance elements with the signal to be controlled introduced across the resistive element, center taps grounded and wipers movable to derive either a positive or negative polarity reduced amplitude proportion of the signal thereon.

6. The combination in accordance with claim 5 wherein said individual amplitude controlling means includes motors for driving said wipers, said motors driven by said derived DC signals.

7. The combination in accordance with claim 5 including means for generating a signal related to velocity and acceleration of said motors, and means for varying the level of said derived DC signals as a function thereof.

8. The combination in accordance with claim 7 including servoamplifier means for driving said motors wherein said level varying means for said derived DC signals is connected to decrease the gain of said servoamplifiers as a function of velocity.

9. A system for cancelling a selected band of frequencies from a communications channel comprising, first means for continuously sampling the signal content of said communications channel, means for dividing said signal content into two quadrature components, second means for continuously sampling the signal content of said communications channel, means for introducing a predetermined delay into said second sample, means for controlling the amplitude of said quadrature components, means for recombining said amplitude controlled quadrature components, means for combining said recombined amplitude controlled quadrature components with said delayed second sample, means for deriving a control signal related to the level of the output of said last combining means, means for applying said control signal to said controlling means to vary the amplitude of said quadrature components to maintain a minimum level at the output of said combining means, and means for passing the residual signal of said communications channel to the output of said system.

10. The combination in accordance with claim 9 wherein said amplitude controlling means comprises a pair of variable electromechanical attenuators including a variable resistance element, a wiper, and electrical drive means for adjusting said wiper with respect to said variable resistance element.

11. The combination in accordance with claim 9 including means responsive to movement of said variable electromechanical attenuator for varying the level of said control signal.

12. The combination in accordance with claim 11 including servoamplifier means for providing drive current for said variable electromechanical attenuator, said servoamplifier connected to receive input signals from said control signal developing means and from said movement responsive means.

13. The combination in accordance with claim 12 wherein said servoamplifier means combine said input signals to provide a drive current directly related to the level of said control signal and inversely related to the velocity of said variable electromechanical attenuator.

* * * * *